(12) United States Patent
Lester et al.

(10) Patent No.: US 11,438,319 B2
(45) Date of Patent: *Sep. 6, 2022

(54) ENCRYPTED GROUP COMMUNICATION METHOD

(71) Applicant: Cyph Inc., Dover, DE (US)

(72) Inventors: Ryan Lester, Dover, DE (US); Bryant Zadegan, Dover, DE (US)

(73) Assignee: CYPH INC., Dover, DE (US)

( * ) Notice: Subject to any disclaimer, the term of this patent is extended or adjusted under 35 U.S.C. 154(b) by 122 days.

This patent is subject to a terminal disclaimer.

(21) Appl. No.: 16/902,530

(22) Filed: Jun. 16, 2020

(65) Prior Publication Data

US 2020/0314077 A1 Oct. 1, 2020

Related U.S. Application Data

(63) Continuation of application No. 15/941,029, filed on Mar. 30, 2018, now Pat. No. 10,701,047, which is a (Continued)

(51) Int. Cl.
*H04L 9/40* (2022.01)
*H04L 9/08* (2006.01)
(Continued)

(52) U.S. Cl.
CPC .......... *H04L 63/065* (2013.01); *G06F 21/40* (2013.01); *G06F 21/606* (2013.01); *H04L 9/0833* (2013.01); *H04L 9/3215* (2013.01); *H04L 51/04* (2013.01); *H04L 51/58* (2022.05); *H04L 63/0435* (2013.01); *H04L 63/0442* (2013.01); *G06F 2221/2107* (2013.01); *H04L 2463/082* (2013.01)

(58) Field of Classification Search
CPC ... H04L 63/065; H04L 9/0833; H04L 9/3215; H04L 51/04; H04L 51/38; H04L 63/0435; H04L 2463/082; G06F 21/40; G06F 21/606; G06F 2221/2107
See application file for complete search history.

(56) References Cited

U.S. PATENT DOCUMENTS 6,064,736 A 5/2000 Davis
6,088,799 A 7/2000 Morgan
(Continued)

OTHER PUBLICATIONS

International Search Report from International Application No. PCT/US2015/047788 dated Dec. 15, 2015.

*Primary Examiner* — Ghodrat Jamshidi
(74) *Attorney, Agent, or Firm* — Brundidge & Stanger, P.C.

(57) ABSTRACT

Embodiments herein include, for example, a method, comprising: generating a shared symmetric key to begin a communication session among a group of users by a first user; distributing, by the first user, the generated shared symmetric key to each user in the group of users; communicating within the communication session among a group of users, where each user encrypts a message to the group of users to be distributed through the communication session using the generated shared symmetric key, and each user decrypts a message received from the communication session using the generated shared symmetric key.

31 Claims, 3 Drawing Sheets

Related U.S. Application Data continuation of application No. 14/841,281, filed on Aug. 31, 2015, now Pat. No. 9,948,625.

(60) Provisional application No. 62/100,684, filed on Jan. 7, 2015.

(51) Int. Cl.

| | |
|---|---|
| *H04L 9/32* | (2006.01) |
| *G06F 21/40* | (2013.01) |
| *G06F 21/60* | (2013.01) |
| *H04L 51/58* | (2022.01) |
| *H04L 51/04* | (2022.01) |

(56) References Cited

U.S. PATENT DOCUMENTS

| | | |
|---|---|---|
| 6,170,017 B1 | 1/2001 | Dias |
| 6,292,896 B1 | 9/2001 | Guski et al. |
| 6,629,150 B1 | 9/2003 | Huded |
| 6,738,907 B1 | 5/2004 | Carter |
| 6,823,068 B1 | 11/2004 | Samid |
| 6,834,112 B1 | 12/2004 | Brickell |
| 7,085,926 B1 | 8/2006 | Peach |
| 7,181,620 B1* | 2/2007 | Hur .............. H04L 63/061 713/168 |
| 7,272,231 B2 | 9/2007 | Jonas |
| 7,366,110 B2 | 4/2008 | Gillespie |
| 7,447,903 B2 | 11/2008 | Sandhu |
| 7,602,709 B1 | 10/2009 | Cheng et al. |
| 7,987,363 B2 | 7/2011 | Chauncey |
| 8,549,315 B2 | 10/2013 | Read |
| 8,607,070 B2 | 12/2013 | Chen |
| 8,640,214 B2 | 1/2014 | Denis |
| 8,763,097 B2 | 6/2014 | Bhatnagar |
| 8,839,451 B1 | 9/2014 | Lam |
| 8,966,267 B1 | 2/2015 | Pahl |
| 9,674,162 B1 | 6/2017 | Miller |
| 9,705,856 B2 | 7/2017 | Gehrmann |
| 9,883,233 B1* | 1/2018 | Barton .............. H04H 20/40 |
| 2002/0040431 A1 | 4/2002 | Kato |
| 2002/0053024 A1 | 5/2002 | Hashimoto |
| 2002/0191797 A1 | 12/2002 | Perlman |
| 2003/0014637 A1 | 1/2003 | Ellison et al. |
| 2003/0028813 A1 | 2/2003 | Lewis |
| 2003/0108205 A1 | 6/2003 | Joyner |
| 2003/0163697 A1 | 8/2003 | Pala |
| 2003/0196087 A1 | 10/2003 | Stringer |
| 2003/0217171 A1 | 11/2003 | Von Stuermer |
| 2004/0002384 A1 | 1/2004 | Multerer |
| 2004/0059735 A1 | 3/2004 | Gold |
| 2004/0081320 A1 | 4/2004 | Jordan |
| 2004/0165727 A1 | 8/2004 | Moreh et al. |
| 2004/0194027 A1 | 9/2004 | Suzuki |
| 2004/0216150 A1 | 10/2004 | Scheifier et al. |
| 2005/0160045 A1 | 7/2005 | Watanabe |
| 2005/0235148 A1 | 10/2005 | Scheidt et al. |
| 2005/0251677 A1 | 11/2005 | Maeda |
| 2006/0123082 A1 | 6/2006 | Digate |
| 2006/0195816 A1 | 8/2006 | Grandcolas |
| 2006/0230272 A1 | 10/2006 | Lawrence |
| 2006/0248336 A1 | 11/2006 | Logan et al. |
| 2007/0016401 A1 | 1/2007 | Ehsani |
| 2007/0038853 A1* | 2/2007 | Day .............. H04L 63/061 713/153 |
| 2007/0136361 A1 | 6/2007 | Lee |
| 2007/0136579 A1 | 6/2007 | Levy |
| 2007/0168432 A1 | 7/2007 | Lustgarten |
| 2007/0201702 A1 | 8/2007 | Hendricks |
| 2008/0170689 A1 | 7/2008 | Boubion et al. |
| 2008/0196084 A1 | 8/2008 | Hawkes et al. |
| 2008/0209221 A1 | 8/2008 | Vennelakanti |
| 2009/0055655 A1 | 2/2009 | Ziv |
| 2009/0083542 A1 | 3/2009 | Craft |
| 2009/0313475 A1 | 12/2009 | Roscoe et al. |
| 2010/0023768 A1* | 1/2010 | Lin .............. H04W 12/069 380/279 |
| 2010/0031036 A1 | 2/2010 | Chauncey |
| 2010/0100721 A1 | 4/2010 | Su |
| 2010/0185855 A1 | 7/2010 | Margoius et al. |
| 2010/0250939 A1 | 9/2010 | Adams |
| 2010/0296651 A1* | 11/2010 | Tkacik .............. H04L 9/088 380/44 |
| 2010/0318807 A1 | 12/2010 | Wang |
| 2011/0087890 A1 | 4/2011 | Munsil |
| 2011/0246783 A1 | 10/2011 | Unagami |
| 2011/0307695 A1* | 12/2011 | Slater .............. G06F 21/604 713/163 |
| 2011/0320808 A1 | 12/2011 | Swingler et al. |
| 2012/0066504 A1 | 3/2012 | Hird |
| 2012/0124567 A1 | 5/2012 | Landry |
| 2012/0131143 A1 | 5/2012 | Nakazawa |
| 2012/0144198 A1 | 6/2012 | Har |
| 2012/0233674 A1 | 9/2012 | Gladstone et al. |
| 2012/0290842 A1 | 11/2012 | Artishdad |
| 2012/0297206 A1* | 11/2012 | Nord .............. G06F 21/78 713/193 |
| 2013/0080785 A1 | 3/2013 | Ruhlen |
| 2013/0097419 A1 | 4/2013 | Lu |
| 2013/0101121 A1* | 4/2013 | Nordholt .............. H04L 9/3236 380/279 |
| 2013/0159704 A1 | 6/2013 | Chandrasekaran |
| 2013/0212401 A1 | 8/2013 | Lin |
| 2013/0239207 A1 | 9/2013 | Otsuka |
| 2013/0254408 A1 | 9/2013 | Sreenivasan |
| 2013/0322451 A1 | 12/2013 | Wang |
| 2014/0040873 A1 | 2/2014 | Goldman |
| 2014/0108810 A1 | 4/2014 | Chenna |
| 2014/0115170 A1 | 4/2014 | Yang |
| 2014/0129977 A1 | 5/2014 | Kao |
| 2014/0164768 A1 | 6/2014 | Kruglick |
| 2014/0201517 A1 | 7/2014 | Corrion |
| 2014/0222916 A1 | 8/2014 | Foley |
| 2014/0237565 A1 | 8/2014 | Fleysher |
| 2014/0281485 A1* | 9/2014 | Ganesan .............. H04L 63/0876 713/153 |
| 2014/0281508 A1* | 9/2014 | Akhter .............. H04L 9/0833 713/162 |
| 2014/0310514 A1 | 10/2014 | Favero |
| 2015/0074407 A1 | 3/2015 | Palmeri |
| 2015/0188899 A1 | 7/2015 | Bakar |
| 2015/0195261 A1* | 7/2015 | Gehrmann .............. H04L 9/0833 726/7 |
| 2015/0200781 A1 | 7/2015 | Tu |
| 2015/0205950 A1 | 7/2015 | Vayvod |
| 2015/0281372 A1 | 10/2015 | Wilson |
| 2015/0326395 A1 | 11/2015 | Lemke |
| 2015/0350894 A1 | 12/2015 | Brand |
| 2016/0056957 A1* | 2/2016 | Clarke .............. H04W 12/04 380/285 |
| 2016/0105425 A1 | 4/2016 | Clausen |
| 2016/0149867 A1 | 5/2016 | Lohr |
| 2016/0182497 A1 | 6/2016 | Smith |
| 2016/0373462 A1 | 12/2016 | Wang |
| 2017/0019437 A1 | 1/2017 | Phadnis |
| 2019/0007204 A1* | 1/2019 | Field .............. H04L 9/3226 |

\* cited by examiner

ENCRYPTED GROUP COMMUNICATION METHOD

CROSS-REFERENCE TO RELATED APPLICATIONS

This application is a Continuation of U.S. Ser. No. 15/941,029, filed Mar. 30, 2018; which is a Continuation of U.S. Ser. No. 14/841,281, filed Aug. 31, 2015, now U.S. Pat. No. 9,948,625 and claims priority to U.S. Provisional Application No. 62/100,684, entitled "ENCRYPTED GROUP COMMUNICATION METHOD" and filed Jan. 7, 2015.

The subject matter of the present application is related to that disclosed in the following co-pending applications:

Ser. No. 14/841,327, entitled "CROSS-CLIENT COMMUNICATION METHOD" and filed Aug. 31, 2015 and claiming priority to U.S. Provisional Application No. 62/100,674, filed on Jan. 7, 2015;

Ser. No. 14/841,318, entitled "CRYPTOGRAPHIC METHOD FOR SECURE COMMUNICATIONS" and filed Aug. 31, 2015 and claiming priority to U.S. Provisional Application No. 62/100,676, filed on Jan. 7, 2015;

Ser. No. 14/841,313, entitled "METHOD OF DENIABLE ENCRYPTED COMMUNICATIONS" and filed Aug. 31, 2015 and claiming priority to U.S. Provisional Application No. 62/100,682, filed on Jan. 7, 2015;

Ser. No. 14/841,310, entitled "METHOD OF GENERATING A DENIABLE ENCRYPTED COMMUNICATIONS VIA PASSWORD ENTRY" and filed Aug. 31, 2015 and claiming priority to U.S. Provisional Application No. 62/100,686, filed on Jan. 7, 2015;

Ser. No. 14/841,288, entitled "MULTI-KEY ENCRYPTION METHOD" and filed Aug. 31, 2015 and claiming priority to U.S. Provisional Application No. 62/100,688, filed on Jan. 7, 2015;

Ser. No. 14/841,302, entitled "METHOD OF EPHEMERAL ENCRYPTED COMMUNICATIONS" and filed Aug. 31, 2015 and claiming priority to U.S. Provisional Application No. 62/100,689, filed on Jan. 7, 2015;

Ser. No. 14/841,292, entitled "METHOD OF MULTI-FACTOR AUTHENTICATION DURING ENCRYPTED COMMUNICATIONS" and filed Aug. 31, 2015 and claiming priority to U.S. Provisional Application No. 62/100,692, filed on Jan. 7, 2015;

Ser. No. 14/841,296, entitled "METHOD OF USING SYMMETRIC CRYPTOGRAPHY FOR BOTH DATA ENCRYPTION AND SIGN-ON AUTHENTICATION" and filed Aug. 31, 2015 and claiming priority to U.S. Provisional Application No. 62/100,693, filed on Jan. 7, 2015, and Ser. No. 15/001,015, entitled "SYSTEM AND METHOD OF CRYPTOGRAPHICALLY SIGNING WEB APPLICATIONS" and filed Aug. 31, 2015 and claiming priority to U.S. Provisional Application No. 62/104,307, filed on Jan. 16, 2015.

The content of the above applications are incorporated by reference in their entirety.

BACKGROUND

Technical Field

The embodiments herein generally relate to cryptography, and, more particularly, to a method of encrypted group communications.

Description of the Related Art

With communication occurring through a variety of communication channels, often to a group of individuals, information such as personal data and other sensitive information may be passed across a public network, such as the Internet. Such communication may include, for example, credential information, payment information, and/or personal account management information. To protect sensitive information, the information can be transmitted over a secure transmission connection provided by an encryption system.

Conventional encryption systems are often difficult to use and thereby introduce weaknesses in the overall systems. For example, asymmetric encryption relies on complex mathematics applied to private and public information (e.g., private and public keys) and is inherently inefficient. Symmetric encryption is significantly more efficient, but relies on secret information (e.g., a password, passphrase, or private key) that must remain private between all persons or devices with authorized access to the encrypted data.

The difficulties of conventional encryption systems increase when the secret information is publicly known. For example, when the secret information is publicly known, the entire encryption system becomes compromised and must be revised (e.g., resetting passwords, passphrases, private keys, etc.). Since various methods to obtain this secret information are well known and frequently use—techniques such as such as man-in-the-middle attacks, social engineering—it is therefore desirable to reduce exposure to an encryption system's private information when communication within a group and thereby reducing the potential attack surface employing such an encryption system.

SUMMARY

In view of the foregoing, an embodiment herein provides a method, comprising: generating a shared symmetric key to begin a communication session among a group of users by a first user; distributing, by the first user, the generated shared symmetric key to each user in the group of users; communicating within the communication session among a group of users, wherein each user encrypts a message to the group of users to be distributed through the communication session using the generated shared symmetric key, and each user decrypts a message received from the communication session using the generated shared symmetric key. In such a method, additional users may be added to the communication session when the first user distributes to the additional users the generated shared symmetric key. In addition, changing users within the group of users to reform the communication session among a new group of users may include: generating a new shared symmetric key by the first user; distributing, by the first user, the generated new shared symmetric key to each user in the new group of users; communicating to the communication session among a new group of users, wherein each user encrypts a message to the new group of users to be distributed through the communication session using the generated new shared symmetric key, and each user decrypts a message received from the communication session using the generated new shared symmetric key.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of encrypted group communication. For example, a user (e.g., "Alice") of an encrypted communication system (e.g., the Cyph™ secure messaging platform) would like to engage several other users to the system (e.g., "Bob," "Carl," and "David") in an encrypted group communication. Conventional encrypted communication systems, however, require significant resources to encrypt and maintain encrypted group communications. For example, convention encrypted communication systems require N, to as many as N! (where N is the number of messages transmitted to the group), long-lived sessions (e.g., last multiple messages or multiple sessions). According to the embodiments herein, however, all encrypted group communications between Alice, Bob, Carl and David require N short-lived secure communication sessions and 1 long-lived session. As such, the embodiments herein are more efficient in computation use and network bandwidth use. These benefits are especially important in energy-constrained environments (such as communication that occurs on a mobile device relying on stored energy (e.g., a battery) to power the device). Additionally, the embodiments herein are simple, and more convenient, to implement, compared to conventional encrypted group communication systems.

Figure 1:
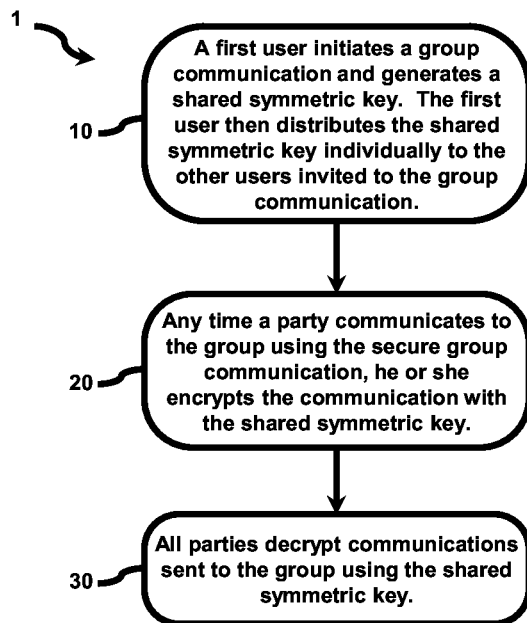
FIG. 1 illustrates a flow diagram illustrating a method of an encrypted group communication according to an embodiment herein.
Figure 2:
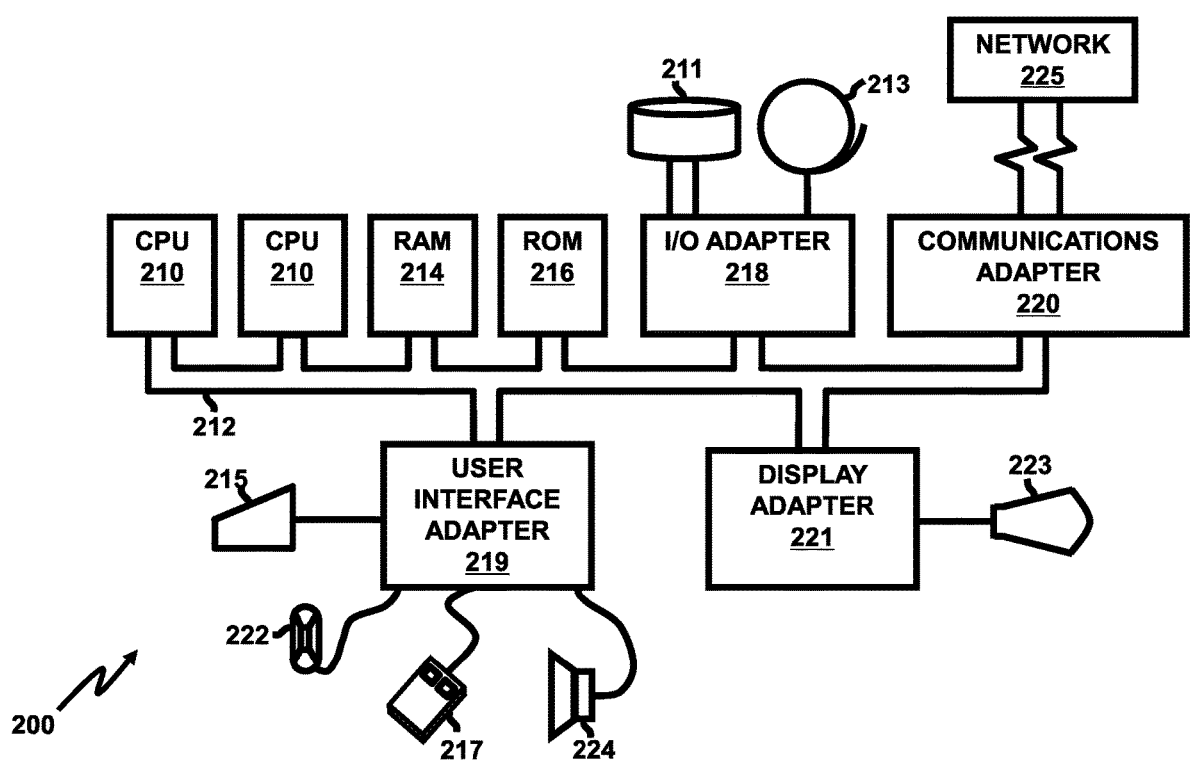
FIG. 2 illustrates a schematic diagram of a computer architecture used in accordance with the embodiments herein.
Figure 3:
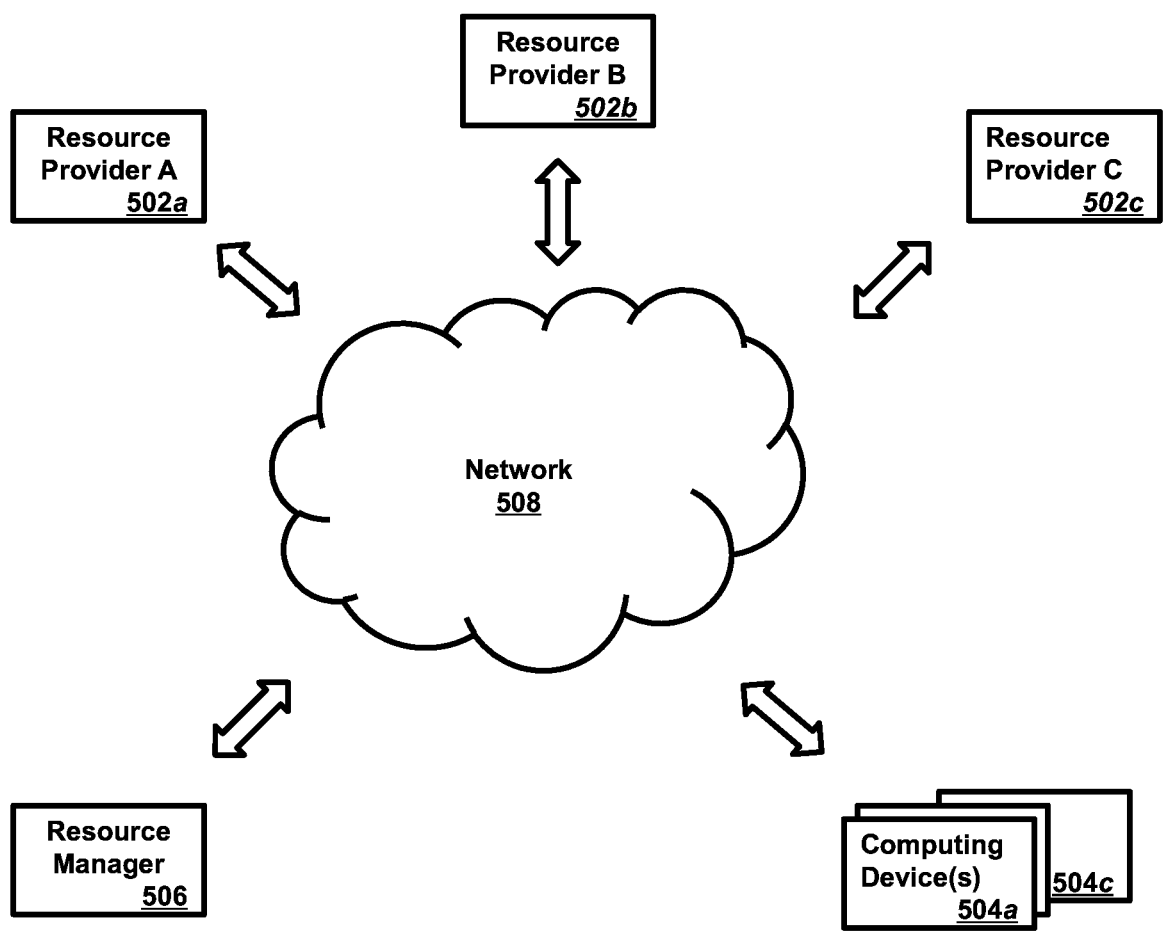
FIG. 3 illustrates a schematic diagram of a network architecture used in accordance with the embodiments herein.

Referring now to the drawings, and more particularly to FIGS. 1 through 3, where similar reference characters denote corresponding features consistently throughout the figures, there are shown preferred embodiments.

FIG. 1 illustrates a flow diagram illustrating a method 1 of an encrypted group communication according to an embodiment herein. As shown in FIG. 1, in step 10, a first user (e.g., Alice) initiates a group communication session (e.g., on the Cyph™ secure messaging platform) with a Server (e.g., a computing device shown in FIGS. 2 and 3) and generates a shared symmetric key to be used by the group. According to one embodiment herein, Alice specifies all users in the group when initiating the group communication session. The first user then distributes the shared symmetric key individually to the other users (e.g., "Bob," "Carl" and "David") invited to the group communication. For example, Alice distributes the shared symmetric key to Bob, Carl and David on at least one of the following communication platforms: the Cyph™ secure messaging platform, the Off-The-Record ("OTR") messaging platform and email messages using Pretty Good Privacy ("PGP") encryption. Embodiments described herein, however, are not limited to these distribution methods and may include other methods of distribution known to those skilled in the art. According to one embodiment herein, when a user joins or leaves the group, the most senior member (e.g., Alice) may generate and redistribute a new shared symmetric key.

According to step 20, any time a party communicates to the group using the secure group communication, that party encrypts the communication with the shared symmetric key. Moreover, according to step 30, all parties decrypt communications sent to the group using the shared symmetric key. While not shown in FIG. 1, according to one embodiment herein, the secure group communication session terminates when the shared symmetric key is revoked.

FIG. 3 illustrates an implementation of an exemplary networking environment (e.g., cloud computing environment 500) for the embodiments described herein is shown and described. The cloud computing environment 500 may include one or more resource providers 502 *a*, 502 *b*, 502 *c* (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504 *a*, 504 *b*, 504 *c* (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 2. This schematic drawing illustrates a hardware configuration of an information handling/computer system 200 in accordance with the embodiments herein. The system comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments herein. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 which may be embodied as an output device such as a monitor, printer, or transmitter, for example.

For example, FIG. 2 includes exemplary embodiments of a computing device and a mobile computing device that can be used to implement the techniques described in this disclosure. As a computing device, system 200 is intended to represent various forms of digital computers, such as laptops, desktops, workstations, personal digital assistants, servers, blade servers, mainframes, and other appropriate computers. As a mobile computing device, system 200 is intended to represent various forms of mobile devices, such as personal digital assistants, cellular telephones, smartphones, and other similar computing devices. The components shown here, their connections and relationships, and their functions, are meant to be examples only, and are not meant to be limiting.

Thus, as a computing device, system 200 includes a processor (e.g., CPUs 210), a memory 214, storage units (e.g., ROM 216, disk units 211, tape drives 213), a high-speed interface 218 connecting to the memory 214 and multiple high-speed expansion ports 219, and a low-speed interface (not shown) connecting to a low-speed expansion port (not shown) and a storage device. Each of the processors, the memory 214, the storage device, the high-speed interface 218, the high-speed expansion ports 219, and the low-speed interface, are interconnected using various busses (e.g., bus 212), and may be mounted on a common motherboard or in other manners as appropriate. The processor can process instructions for execution within the computing device, including instructions stored in the memory 214 or on the storage device to display graphical information for a GUI on an external input/output device, such as a display 223 coupled to the high-speed interface 219. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 214 stores information within the computing device. In some implementations, the memory 214 is a volatile memory unit or units. In some implementations, the memory 214 is a non-volatile memory unit or units. The memory 214 may also be another form of computer-readable medium, such as a magnetic or optical disk.

The storage device is capable of providing mass storage for the computing device. In some implementations, the storage device may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor), perform one or more methods, such as those described above. The instructions can also be stored by one or more storage devices such as computer- or machine-readable mediums (for example, the memory 214, the storage device, or memory on the processor).

The high-speed interface 218 manages bandwidth-intensive operations for the computing device, while the low-speed interface manages lower bandwidth-intensive operations. Such allocation of functions is an example only. In some implementations, the high-speed interface 218 is coupled to the memory 214, the display 223 (e.g., through a graphics processor or accelerator), and to the high-speed expansion ports 219, which may accept various expansion cards (not shown). In the implementation, the low-speed interface is coupled to the storage device and the low-speed expansion port. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms, as shown in the figure. For example, it may be implemented as a standard server, or multiple times in a group of such servers. In addition, it may be implemented in a personal computer such as a laptop computer. It may also be implemented as part of a rack server system. Alternatively, components from the computing device may be combined with other components in a mobile device (not shown), such as a mobile computing device. Each of such devices may contain one or more of the computing device and the mobile computing device, and an entire system may be made up of multiple computing devices communicating with each other.

As a mobile computing device, system 200 includes a processor (e.g., CPUs 210), a memory 214, an input/output device such as a display 223, a communication interface 220, and a transceiver (not shown), among other components. The mobile computing device may also be provided with a storage device, such as a micro-drive or other device, to provide additional storage. Each of the processor, the memory 214, the display 223, the communication interface 220, and the transceiver, are interconnected using various buses (e.g., bus 212), and several of the components may be mounted on a common motherboard or in other manners as appropriate.

The processor can execute instructions within the mobile computing device, including instructions stored in the memory 214. The processor may be implemented as a chipset of chips that include separate and multiple analog and digital processors. The processor may provide, for example, for coordination of the other components of the mobile computing device, such as control of user interfaces, applications run by the mobile computing device, and wireless communication by the mobile computing device.

The processor may communicate with a user through a control interface 219 and a display interface (not shown) coupled to the display 223. The display 223 may be, for example, a TFT (Thin-Film-Transistor Liquid Crystal Display) display or an OLED (Organic Light Emitting Diode) display, or other appropriate display technology. The display interface may comprise appropriate circuitry for driving the display 223 to present graphical and other information to a user. The control interface 219 may receive commands from a user and convert them for submission to the processor. In addition, an external interface (not shown) may provide communication with the processor, so as to enable near area communication of the mobile computing device with other devices. The external interface may provide, for example, for wired communication in some implementations, or for wireless communication in other implementations, and multiple interfaces may also be used.

The memory 214 stores information within the mobile computing device. The memory 214 can be implemented as one or more of a computer-readable medium or media, a volatile memory unit or units, or a non-volatile memory unit or units. An expansion memory (not shown) may also be provided and connected to the mobile computing device through an expansion interface (not shown), which may include, for example, a SIMM (Single In Line Memory Module) card interface. The expansion memory may provide extra storage space for the mobile computing device, or may also store applications or other information for the mobile computing device. Specifically, the expansion memory may include instructions to carry out or supplement the processes described above, and may include secure information also. Thus, for example, the expansion memory may be provide as a security module for the mobile computing device, and may be programmed with instructions that permit secure use of the mobile computing device. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor), perform one or more methods, such as those described above. The instructions can also be stored by one or more storage devices, such as one or more computer- or machine-readable mediums (for example, the memory 214, the expansion memory, or memory on the processor). In some implementations, the instructions can be received in a propagated signal, for example, over the transceiver or the external interface.

The mobile computing device may communicate wirelessly through the communication interface 220, which may include digital signal processing circuitry where necessary. The communication interface 220 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver using a radio-frequency. In addition, short-range communication may occur, such as using a Bluetooth®, Wi-Fi™, or other such transceiver (not shown). In addition, a GPS (Global Positioning System) receiver module (not shown) may provide additional navigation- and location-related wireless data to the mobile computing device, which may be used as appropriate by applications running on the mobile computing device.

The mobile computing device may also communicate audibly using an audio codec, which may receive spoken information from a user and convert it to usable digital information. The audio codec may likewise generate audible sound for a user, such as through a speaker (e.g., speaker 212 or in a handset of the mobile computing device). Such sound may include sound from voice telephone calls, may include recorded sound (e.g., voice messages, music files, etc.) and may also include sound generated by applications operating on the mobile computing device.

The mobile computing device may be implemented in a number of different forms, as shown in the figure. For example, it may be implemented as a cellular telephone (not shown). It may also be implemented as part of a smartphone, personal digital assistant, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-implemented method, comprising:
generating a shared symmetric key to begin a communication session among a group of users, wherein the group communication session is a long-lived session;
distributing the generated shared symmetric key to each user in the group of users; and
communicating within the communication session among a group of users, wherein
each user encrypts a message to the group of users to be distributed through the communication session using the generated shared symmetric key, and
each user decrypts a message received from the communication session, using the generated shared symmetric key,
wherein each encrypted group communication comprises a short-lived secure communication session.

2. The method of claim 1, further comprising adding one or more additional users to the communication session and distributing the generated shared symmetric key to the one or more additional users, wherein
each additional user encrypts a message to the group of users to be distributed through the communication session using the generated shared symmetric key, and
each additional user decrypts a message received from the communication session, using the generated shared symmetric key.

3. The method of claim 1, further comprising changing users within the group of users to reform the communication session among a new group of users comprises:
generating a new shared symmetric key; and
distributing the generated new shared symmetric key to each user in the new group of users.

4. The method of claim 3, further comprising: communicating to the communication session among the new group of users, wherein
each user encrypts a message to the new group of users to be distributed through the communication session using the generated new shared symmetric key, and
each user decrypts a message received from the communication session using the generated new shared symmetric key.

5. An encrypted communication system comprising: a server including a processor and a memory operatively coupled to the processor, and one or more client devices, wherein
the server receives a request for initiating a communication session for a group of client devices from a first client device, and initiates a communication session for the group of client devices, wherein the communication session is a long-lived session; and
a shared symmetric key is generated to be used by the group of client devices; and the shared symmetric key is distributed to each of the group of client devices; and wherein
each client device from the group of client devices encrypts a message to the group of client devices to be distributed through the communication session using the generated shared symmetric key, and
each client device from the group of client devices decrypts a message received from any one of the group of the client devices through the communication session, using the generated shared symmetric key, wherein each encrypted group communication comprises a short-lived secure communication session.

6. The system of claim 5, wherein the generated shared symmetric key is distributed to one or more additional client devices when adding the one or more additional client devices to the communication session.

7. The system of claim 5, further comprising changing client devices within the group of client devices to reform the communication session among a new group of client devices comprises:
generating a new shared symmetric key; and
distributing the generated new shared symmetric key to each client device in the new group of client devices.

8. The system of claim 7, further comprising: communicating to the communication session among the new group of client devices, wherein
each client device from the new group of client devices encrypts a message to the new group of client devices to be distributed through the communication session using the generated new shared symmetric key, and
each client device from the new group of client devices decrypts a message received from any one of the new group of the client devices through the communication session using the generated new shared symmetric key.

9. The system of claim 5, wherein each client device from the group of client devices comprises any one of: a laptop, a desktop, a workstation, a personal digital assistant, a cellular telephone, a watch and a smart-phone.

10. An encrypted communication system comprising: a server including a processor and a memory operatively coupled to the processor, and one or more client devices, wherein
a first client device of the one or more client devices initiates a communication session for a group of client devices, wherein the communication session is a long-lived session; and
a shared symmetric key is generated to be used by the group of client devices; and
the shared symmetric key is distributed to each of the group of client devices; and wherein
each client device from the group of client devices encrypts a message to the group of client devices to be distributed through the communication session using the generated shared symmetric key, and
each client device from the group of client devices decrypts a message received from any one of the group of the client devices through the communication session, using the generated shared symmetric key,
wherein each encrypted group communication comprises a short-lived secure communication session.

11. The system of claim 10, wherein the generated shared symmetric key is further distributed to one or more additional client devices when adding the one or more additional client devices to the communication session.

12. The system of claim 10, further comprising changing client devices within the group of client devices to reform the communication session among a new group of client devices comprises:
generating a new shared symmetric key; and
distributing the generated new shared symmetric key to each client device in the new group of client devices.

13. The system of claim 12, further comprising: communicating to the communication session among the new group of client devices, wherein
each client device from the new group of client devices encrypts a message to the new group of client devices to be distributed through the communication session using the generated new shared symmetric key, and
each client device from the new group of client devices decrypts a message received from any one of the new group of the client devices through the communication session using the generated new shared symmetric key.

14. The system of claim 10, wherein each client device from the group of client devices comprises any one of: a laptop, a desktop, a workstation, a personal digital assistant, a cellular telephone, a watch and a smart-phone.

15. A non-transitory computer-readable storage medium having computer-executable instructions stored thereon that are executable by a processor to cause a computer to perform a method, the method comprising:
generating a shared symmetric key to begin a communication session among a group of users, wherein the group communication session is a long-lived session;
distributing the generated shared symmetric key to each user in the group of users; and communicating within the communication session among a group of users; wherein
each user encrypts a message to the group of users to be distributed through the communication session using the generated shared symmetric key, and
each user decrypts a message received from the communication session, using the generated shared symmetric key,
wherein each encrypted group communication comprises a short-lived secure communication session.

16. The non-transitory computer-readable storage medium of claim 15, further comprising adding one or more additional users to the communication session and distributing the generated shared symmetric key to the one or more additional users, wherein
each additional user encrypts a message to the group of users to be distributed through the communication session using the generated shared symmetric key, and
each additional user decrypts a message received from the communication session, using the generated shared symmetric key.

17. The non-transitory computer-readable storage medium of claim 15, further comprising changing users within the group of users to reform the communication session among a new group of users comprises:
generating a new shared symmetric key; and
distributing the generated new shared symmetric key to each user in the new group of users.

18. The non-transitory computer-readable storage medium of claim 17, further comprising: communicating to the communication session among the new group of users, wherein
each user encrypts a message to the new group of users to be distributed through the communication session using the generated new shared symmetric key, and
each user decrypts a message received from the communication session using the generated new shared symmetric key.

19. An encrypted communication system comprising: a server including a processor and a memory operatively coupled to the processor, and one or more clients, wherein
the server receives a request for initiating a communication session for a group of clients from a first client, and initiates a communication session for the group of clients, wherein the communication session is a long-lived session;

the first client generates a symmetric key to begin the communication session among the group of clients and distributes the generated symmetric key to each client in the group of clients;

communication is conducted within the communication session among the group of clients, wherein each client encrypts a message to the group of clients to be distributed within the communication session using the generated symmetric key, and each client decrypts a message received within the communication session using the generated symmetric key; and wherein an additional client can be added to the existing communication session when the first client distributes to the additional client the generated symmetric key.

20. The system of claim 19, wherein the client changes clients within the group of clients to reform the communication session among a new group of clients, generates a new symmetric key, and distributes the generated new symmetric key to each client in the new group of clients.

21. The system of claim 20, wherein each client from the new group of clients encrypts a message to the new group of clients within the communication session using the generated new symmetric key, and each client from the new group of clients decrypts a message from the new group of the clients within the communication session using the generated new symmetric key.

22. The system of claim 19, wherein each client in the group clients is implemented by any one of: a laptop, a desktop, a workstation, a personal digital assistant, a cellular telephone, a watch and a smart-phone.

23. A client for use in an encrypted communication system, wherein the encrypted communication system comprises: a server including a processor, a memory operatively coupled to the processor, the client and one or more additional clients, wherein the client transmits to the server a request for initiating a communication session for at least one additional client of the one or more additional clients to form a group of clients;

the server in response to the request from the client initiates a communication session for the group of clients, wherein the communication session is a long-lived session;

communication is conducted within the communication session among the group of clients via the server, wherein each client of the group of clients encrypts a message to the group of clients within the communication session using a symmetric key which was generated and then received by said each client of the group of clients for use within the communication session, and said each client of the group of clients decrypts a message from the group of clients within the communication session using the generated symmetric key; and wherein another additional client can be added to the existing communication session when the generated symmetric key is distributed to the another additional client.

24. The client of claim 23, wherein the client generates the symmetric key received by said each client of the group of clients to be used for communications within the communication session among the group of clients and distributes the generated symmetric key to said each client in the group of clients.

25. The client of claim 24, wherein the client changes the at least one additional client within the group of clients to reform the communication session among a new group of clients, generates a new symmetric key, and distributes the generated new symmetric key to each client in the new group of clients.

26. The client of claim 25, wherein according to the encrypted communication system:

each client from the new group of clients encrypts a message to the new group of clients within the communication session using the generated new symmetric key, and each client from the new group of clients decrypts a message from the new group of the clients within the communication session using the generated new symmetric key.

27. The client of claim 23, wherein each of the client and the at least one additional client is implemented by any one of: a laptop, a desktop, a workstation, a personal digital assistant, a cellular telephone, a watch and a smart-phone.

28. A server for use in an encrypted communication system, wherein the encrypted communication system comprises: the server including a processor, a memory operatively coupled to the processor, and one or more clients, wherein the server receives a request for initiating a communication session for a group of clients from a first client, and initiates a communication session for the group of clients responsive to the request, wherein the communication session is a long-lived session;

the first client generates a symmetric key to be used within the communication session and distributes the generated symmetric key to each client in the group of clients via the server;

communication is conducted within the communication session among the group of clients via the server, wherein each client encrypts a message to the group of clients within the communication session using the generated symmetric key, and each client decrypts a message from the group of clients within the communication session using the generated symmetric key; and wherein an additional client can be added to the communication session when the first client distributes to the additional client the generated symmetric key.

29. The server of claim 28, wherein the first client changes clients within the group of clients to reform the communication session among a new group of clients, generates a new symmetric key, and distributes the generated new symmetric key to each client in the new group of clients.

30. The server of claim 29, wherein according to the encrypted communication system:

each client from the new group of clients encrypts a message to the new group of clients within the communication session using the generated new symmetric key, and each client from the new group of clients decrypts a message from the new group of clients within the communication session using the generated new symmetric key.

31. The server of claim 28, wherein each client is implemented by any one of: a laptop, a desktop, a workstation, a personal digital assistant, a cellular telephone, a watch and a smart-phone.

* * * * *